US008152389B1

(12) United States Patent
Lammens

(10) Patent No.: US 8,152,389 B1
(45) Date of Patent: Apr. 10, 2012

(54) CAMERA SUPPORT APPARATUS

(76) Inventor: Mike Lammens, Denver, CO (US)

( * ) Notice: Subject to any disclaimer, the term of this patent is extended or adjusted under 35 U.S.C. 154(b) by 25 days.

(21) Appl. No.: 12/955,636

(22) Filed: Nov. 29, 2010

(51) Int. Cl.
*G03B 17/00* (2006.01)
(52) U.S. Cl. .......................... 396/419; 396/428
(58) Field of Classification Search .................. 396/419, 396/427, 428; 248/187.1, 200, 211, 214, 248/229.16, 229.26, 230.7, 231.81
See application file for complete search history.

(56) References Cited

U.S. PATENT DOCUMENTS

| 5,538,212 A | 7/1996 | Kennedy |
| 5,897,223 A | 4/1999 | Tritchew et al. |
| 2003/0007795 A1 | 1/2003 | Grober |
| 2003/0161622 A1 | 8/2003 | Zantos |
| 2004/0096207 A1 | 5/2004 | Nakatani |
| 2008/0107413 A1 | 5/2008 | Moore et al. |
| 2010/0155549 A1 | 6/2010 | Robinson |

*Primary Examiner* — W. B. Perkey
*Assistant Examiner* — Minh Phan
(74) *Attorney, Agent, or Firm* — Roger A. Jackson

(57) ABSTRACT

A camera mount supported by a beam. The mount includes an inverted "U" shaped flexible member including first and second fingers that are parallel to one another, a connecting member joins the first and second fingers at one end, the first and second finger free ends have a stiffness of about ten to thirty pounds per inch. Also the mount includes a camera mount interface extending from the connecting member opposite of the first and second fingers. Wherein the first and second fingers and the connecting member have a slip compressive fit over the beam to hold the mount in place, giving the camera an overhead view. The first and second fingers and connecting member deflect outward to facilitate the slip compressive fit.

18 Claims, 12 Drawing Sheets

CAMERA SUPPORT APPARATUS

RELATED APPLICATION

There are no related applications claiming priority.

TECHNICAL FIELD

This invention relates generally to camera mounting apparatus, most commonly but not limited to facilitating a remote camera view or angle of a subject of interest. More particularly to support a mounting apparatus for easily and quickly positioning a camera in a typically hard to reach place while only requiring the need of a single manual user to mount and dismount the camera without tools. A typical use would be in an overhead position to gain a downward perspective on a sporting event.

BACKGROUND OF INVENTION

There exists a need in many situations to easily and quickly mount a camera in an advantageous position, while at the same time minimizing unwanted camera motion. Hand holding the camera is almost always disastrous when trying to record a sporting event as the field of view is limited and the movement of the camera is distracting and hard to watch. The other options for recording a sporting event are either an internally dampened expensive very fast frame camera and/or a multiple axes highly dampened camera mount which also would be an expensive proposition-being what the professional sports networks use, thus not being practical for the individual user.

A remaining and in this case desirable option is to fixably mount the camera in a selected position that will allow a fixed frame of view for the camera of the sporting or other event, that with the proper zoom focus on the lens can pick up the sporting action that is desired without requiring either an expensive camera mount, or an expensive camera. However, the drawback of this method is that a ladder or other means is typically required to install and remove the camera.

This problem is somewhat recognized in the prior art with a number of complex to simple solutions in existence. The solutions exist either within the camera itself and/or are in the camera support or mounting apparatus. The typical complex solution to the aforementioned problem is with the use of either a gyroscopic mount or the use of a Gimbal bearing(s) that allows multi axis movement that is typically termed; roll, pitch, and yaw of a portion of the camera mount that is affixed to for instance, the rolling cart on a track while helping to stabilize the other portion of the camera mount so that the camera keeps a true orientation to the horizon or a selected position with minimal unwanted movement, further keeping a damped fluid movement especially in the case of shooting video. There are additional enhancements to either the gyroscopic mount or to the Gimbal bearing for computer control to help maintain a desired orientation of the camera. Simpler prior art solutions would involve a pendulum mount type of arrangement having single axis or multiple axis capabilities with a counterweight to help maintain the camera orientation to the horizon with movement of the non pendulum portion of the camera mount.

An example of a complex prior art solution would be in U.S. Pat. No. 5,897,223 to Tritchew et al. that is a stabilizing platform system for a camera that helps isolate the camera from multiple axis motion being about the roll, pitch, and yaw axes including a passive vibration isolator, this is accomplished by the use of multiple Gimbal bearings and dampened coil springs, or optionally multiple magnetic torque motors for controlling positioning force against the Gimbal bearing(s). Tritchew et al. would be considered a high end type of camera stabilizing apparatus by having control over multiple axes of undesired camera movement, a vibration isolator, and the ability to control camera movement, typically used to video a sporting event. A further example of a complex part solution would be in United States Patent Application Publication No. US 2003/0007795 A1 to Grober that is a stabilizing camera mount specifically designed to mount upon a buoy that is acted upon by a wave motion when the camera mount attempts to stabilize the camera's view in multiple axes and having remote control for relative camera positioning. Grober utilizes either an electronically stabilized device or a Gimbal bearing.

An example of a simple prior art solution would be in just positioning the camera upward, however, without any stabilization, i.e. a camera on a long stick, which will effectively make worse the movement of the camera, being totally unacceptable for video especially. Several prior art examples follow; in United States patent application publication number US2008/0107413 to Moore et al., being a camera support on a pole to give the camera a view from above, note that Moore et al., has a foot bar for driving the lower part of the pole into the ground, for some measure of added stability-however, inconsistent the stiffness of the earth would be, resulting in inconsistent camera mount stability. A further example is in United States patent application publication number US2010/0155549 to Robinson for a sports camera mount that utilizes a weighted pedestal stand for a floor mounting structure, being designed in particular for volleyball games, however, with Robinson suffering from the previously mentioned problem of inherent stability of the elevated camera, due to moment arm length (the pole length) exacerbating movement at the base that is amplified at the camera mount, which also appears to be able to be knocked over easily, especially in a crowd at the volleyball game. Appearing similar to Robinson in United States patent application publication number 2003/0161622 to Zantos disclosed is a mobile telescoping camera mount, wherein Zantos has a stand comprising four legs as opposed to Robison's flat plate floor mount, so possibly Zantos could better accommodate an uneven surface. A further example for the elevated camera on a pole is in United States patent application number US2004/0096207 to Nakatani that shows a camera mounted up on a pole, wherein it appears that the pole must be continuously hand held, which is even worse that Robinson, Moore et al., or Zantos for camera stability, especially acute in the case of video, note also in Nakatani, it would be difficult to know what exactly what scene one was shooting without the elevated camera in a fixed position, which would be essential, otherwise a remote view finder would be required, which again takes us to an expensive camera.

Lastly, another solution to this problem was put forth by Kennedy in U.S. Pat. No. 5,538,212 wherein a camera support platform that hangs from a fence is described. Kennedy is neither easily transported, nor is it adjustable as to being level in the case of a non horizontal fence beam. Kennedy utilizes two hooks and relies on gravity to hold the platform in place.

There exists therefore a need for a camera support apparatus which is easy to mount and dismount from an upright structure without the need for a ladder. A single user should be able to easily mount and dismount the camera to and from the stable overhead viewpoint, thus better enabling a desirable overhead view. The stability and angle of the viewpoint will then allow a video to be shot with a relatively inexpensive camera.

The present invention relates to the need for a convenient and quick way to mount a video or other camera in places where standard tripods and monopods aren't convenient or practical. The present invention further allows a camera to be mounted in such a way that it is 1) out of the way of foot traffic such as in the case of the participants in a sporting event, the audience at a music concert, or any other event enclosed by fences or walls, and 2) at an elevated angle that allows the user to capture the entire field, court, or stage. This downward angle is obtained by using the pivotal mounting tilting mechanism in the camera mount and by the use of an attached extension structure pole, thus allowing the present invention to be mounted on high objects such as fences, branches, or wires. A typical use is to record a tennis event from the top of a fence in order to see all of the court at the same time, however, the present invention is useful from any height as it affords a very stable mount.

Previous ways of recording images for these types of sports events are mostly made up of camera mount tripods (which because of their bulkiness and the fact that they are on the ground, get in the way of the action) or other more cumbersome ways of hanging the camera from a fence which are not as convenient to mount, use, or transport as the present invention. In the case of a sporting event in which the player is a participant, as in tennis, the present invention allows the participant to easily transport the present invention disposed within a tennis bag and then quickly place it on the enclosing fence. The present invention has a method of positioning the camera for a standard tennis court so that the correct position is obtained by setting the camera bracket to a predetermined angle prior to it being mounted and no further adjustments are required. Alternatively, in places other than a standard tennis court, a couple of seconds of video for instance can be shot and then reviewed, with subsequent small adjustments made to ascertain that the correct angle is obtained. Once the video camera is positioned, it can be left in place and retrieved when the sporting event is over. The present invention also allows the camera to be hung or mounted on a wall or anyplace where a suitable receptacle can be attached to receive the fingers of the present invention described herein.

BRIEF DESCRIPTION OF DRAWINGS

FIG. 9 is a long range rear elevation view being opposite of the FIG. 3 front elevation view, wherein FIG. 9 shows the full extent of the beam height above the surface, the whole of the fence structure, the camera support apparatus with the camera fully installed upon the fence structure, noting that the camera support apparatus can be installed on either side of the fence structure by rotating the camera support apparatus 180 degrees in either case for the "bird's eye view" of the sporting event;

SUMMARY OF INVENTION

Figure 1:
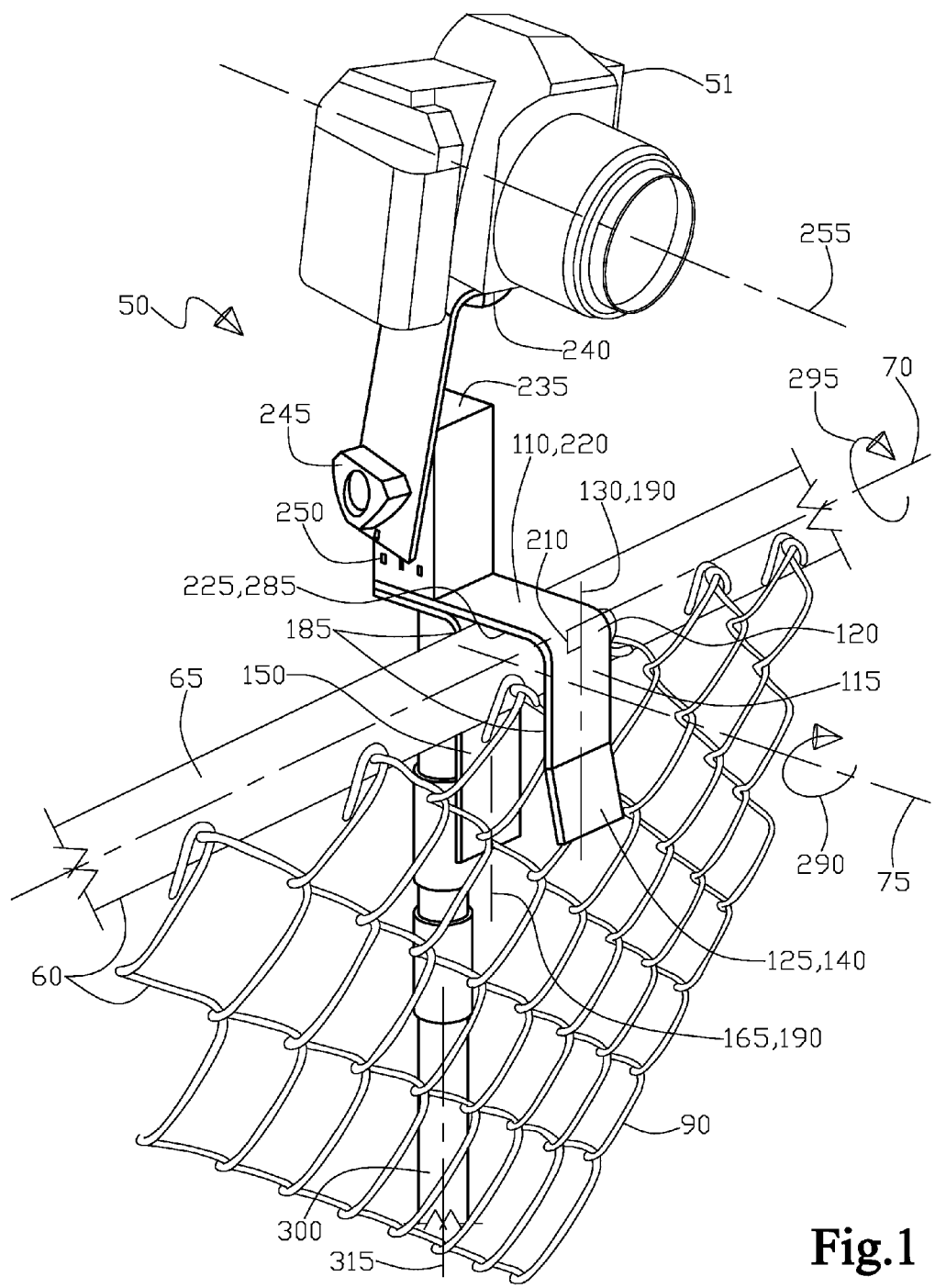
FIG. 1 shows a perspective view of the camera support apparatus installed in use upon a fence structure, wherein a line of focus terminating at a fixed point (not shown) necessitates the camera angling slightly downward via a pivotal mounting on the camera mount interface.

The present invention is a camera support apparatus that is supported by a fence or other structure having a beam with a longitudinal axis and a perpendicular axis, wherein the beam may or may not be adjacent to a chain link wire mesh. The camera support apparatus includes an inverted "U" shaped flexible member including a first finger extension with a first proximal end portion and an opposing first distal end portion with a first extension axis therebetween, also a second finger extension with a second proximal end portion and an opposing second distal end portion with a second extension axis therebetween. Wherein the first and second extension axes are substantially parallel to one another, further the first and second proximal end portions are each joined by a connecting member, wherein a combination of the first and second fingers, and the connecting member have a stiffness K factor range of about ten (10) to thirty (30) pounds per inch at the first and second distal end portions. Also included in the camera support apparatus is a camera mount interface extending from the connecting member, the camera mount interface is positioned opposite of the first and second fingers. The camera mount interface is adapted to removably engage a camera, wherein the first and second fingers and the connecting member have a slip compressive fit removable engagement via the stiffness with a combination of the beam and the chain link wire mesh or optionally the beam alone. Wherein, operationally the combination of first and second fingers and the connecting member deflect outward dimensionally an amount greater than the chain link wire mesh deflecting inwardly or other support structure as the connecting member and the beam approach one another eventually coming into contact with one another to facilitate the slip compressive fit by virtue of friction as between the first and second fingers and the beam and the chain link wire mesh to help prevent movement of a moment about the beam perpendicular axis of the camera support apparatus.

REFERENCE NUMBERS IN DRAWINGS

50 Camera support apparatus
51 Camera
55 Surface
60 Fence structure
65 Beam of the fence structure 60
70 Longitudinal axis of the beam 65
75 Perpendicular axis of the beam 65
80 Outside dimension of the beam 65
85 Height above the surface of the beam 65
90 Chain link wire mesh
95 Outside dimension of wire of the chain link wire mesh 90
100 Thickness of chain link wire mesh 90 (uncompressed)
101 Free projection of the wire 90 from the beam 65
105 Combined dimension of the beam outside dimension 80 and the uncompressed chain link wire mesh thickness 100
110 Inverted "U" shaped flexible member
111 Inverted "L" shaped flexible member
115 First finger extension
120 First proximal end portion
125 First distal end portion
130 First extension axis
131 Length of first finger extension
135 First finger length along the first extension axis 130
140 Partial offset of the first finger extension 115
145 One-third of the first finger length 135 consumed by the partial offset 140
150 Second finger extension
155 Second proximal end portion
160 Second distal end portion
165 Second extension axis
166 Length of second finger extension
170 Substantially parallel relationship between the first 130 and second 165 extension axes
175 Flat sided blade cross sectional profile
176 Flat side of cross sectional profile 175
180 Perpendicular relationship of the flat sided blade cross sectional profile 175 to the first 130 and second 165 extension axes
185 Portion of the first and second finger flat sides 176 that are in frictional contact with the beam 65 alone or with the chain like wire mesh 90 of the extension member 300 proximal end portion 305
190 Major axis
195 Major length of major axis 190
200 Minor axis
205 Minor length of minor axis 200
210 Perpendicular relationship of major axis 190 to the beam longitudinal axis 70
215 Gap distance between the first 115 and second 150 finger extensions
220 Connecting member
221 First finger extension 115 plus connecting member 220 projection
222 First finger extension 115, second finger extension 150, and connecting member 220 thickness
225 Contact area of connecting member 220 parallel with the beam longitudinal axis 70
230 Stiffness K factor
235 Camera mount interface
240 Adapted to removably engage the camera 51 of the camera mount interface 235
245 Selectively adjustable pivotal mounting of the camera mount interface 235
250 Pre-marked angular settings on the camera mount interface 235
255 Line of focus
260 Fixed point
265 Slip compressive fit in terms of force
270 Deflection outwardly of the first 115 and/or second 150 finger extensions and the connecting member 220
275 Inward deflection of the chain link wire mesh 90
280 Connecting member 220 and the beam 65 approaching one another
281 Width of; the connecting member 220, the first 115 and second 150 finger extensions
285 Contact of the beam 65 and the connecting member 220 or the connecting member 220 being adjacent to the beam 65 in the case of the surface 55 and the longitudinal axis 70 are not parallel or the camera 51 is to be mounted non parallel to the surface 55
290 Moment of movement about the beam perpendicular axis 75
295 Moment of movement about the beam longitudinal axis 70
300 Extension structure
305 Proximal end portion of the extension structure 300
310 Distal end portion of the extension structure 300
315 Lengthwise axis of the extension structure 300
320 Removable engagement of the extension structure 300 to the flexible member 110
325 Selectable length adjustment of the extension structure 300
330 Hand grip of the distal end portion 310 of the extension structure 300
335 Positioning the first finger offset 140 adjacent to the chain link wire mesh 90 and the second finger distal end portion 160 in contact with the beam 65
340 Manual movement of the extension structure distal end portion 310
345 Pulling the extension structure distal end portion 310 manually away from the beam 65

350 Ceasing the pulling step when the beam 65 and the connecting member 220 contact or adjacent 285

355 Camera support apparatus 50 installed in place upon the fence structure 60 or beam 65

360 Pushing the extension structure 300 toward the beam 65 to remove the camera support apparatus 50 from the fence structure 60

DETAILED DESCRIPTION

Figure 2:
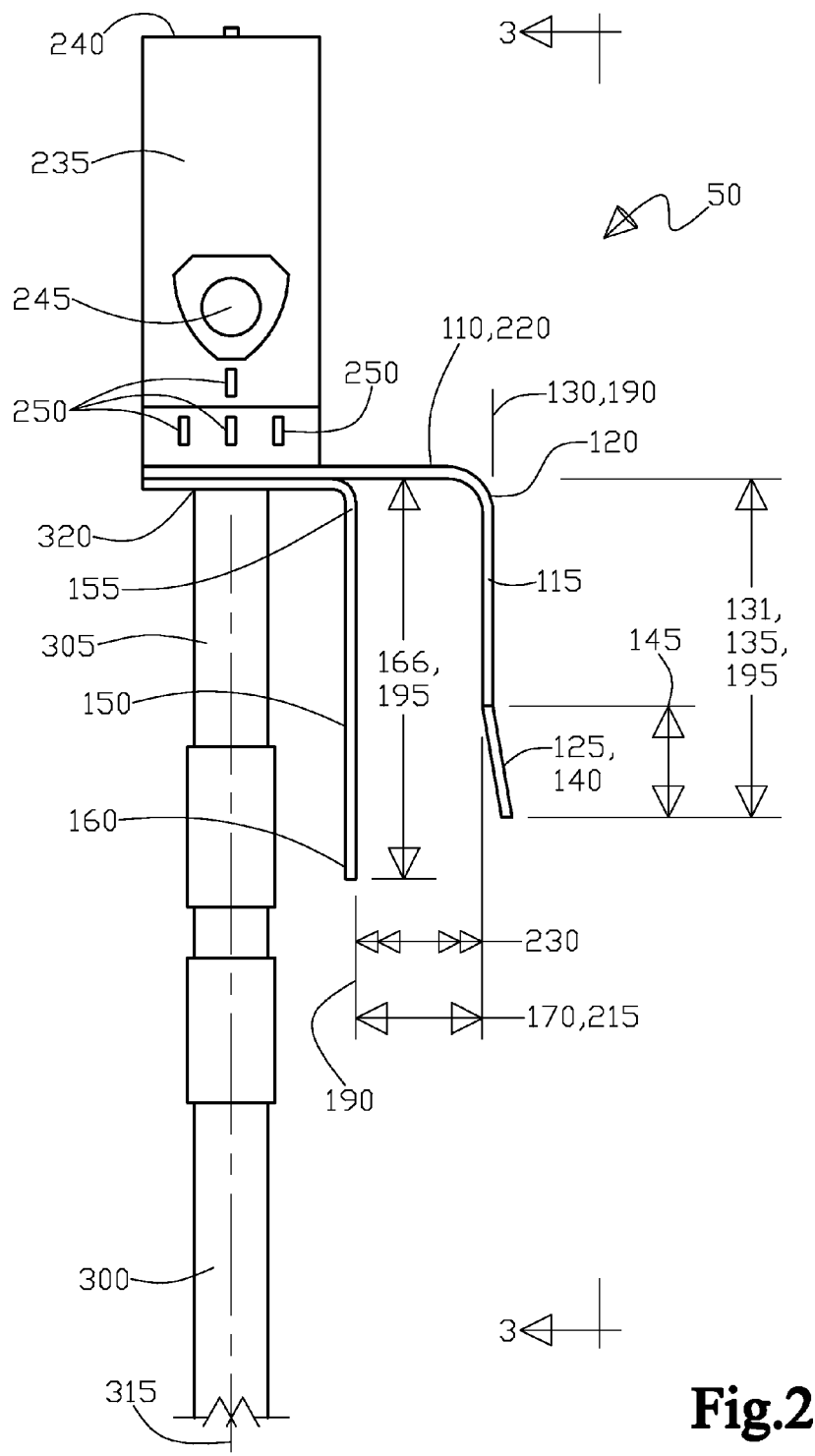
FIG. 2 shows a side elevation view of the camera support apparatus not installed on the fence structure including the first finger extension with a partial offset and the second finger extension, the connecting member, the camera mount interface with pivotal mounting, and the extension structure.

With initial reference to FIG. 1 shown is the perspective view of the camera support apparatus 50 installed in use upon the fence structure 60 with a camera mount 235 onto the camera support apparatus 50, wherein a line of focus 255 terminating at a fixed point 260 (not shown-see FIG. 10) necessitates the camera 51 angling slightly downward via a pivotal mounting 245 on the camera mount interface 235. Next, FIG. 2 shows a side elevation view of the camera support apparatus 50 not installed on the fence structure 60 including the first finger extension 115 with a partial offset 140 and the second finger extension 150, the connecting member 220, the camera mount interface 235 with pivotal mounting 245, and the extension structure 300. Further, FIG. 3 shows a front elevation view 3-3 from FIG. 2 of the camera support apparatus 50 not installed on the fence structure 60 including the first finger extension 115 with the partial offset 140 and the second finger distal end portion 160, the camera mount interface 235 with pivotal mounting 245, and the extension structure 300.

Figure 3:
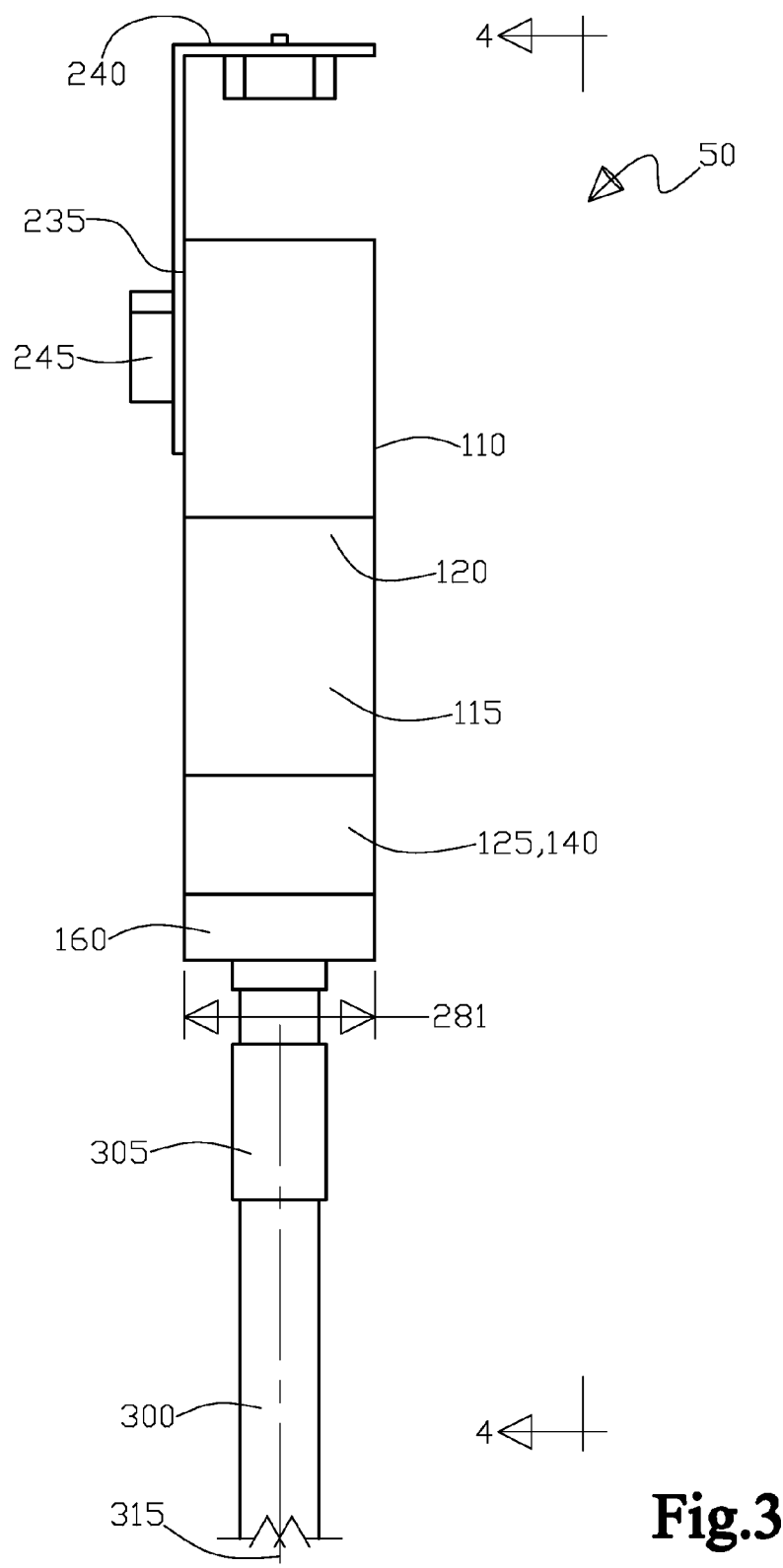
FIG. 3 shows a front elevation view 3-3 from FIG. 2 of the camera support apparatus not installed on the fence structure including the first finger extension with the partial offset and the second finger distal end portion, the camera mount interface with pivotal mounting, and the extension structure.
Figure 4:
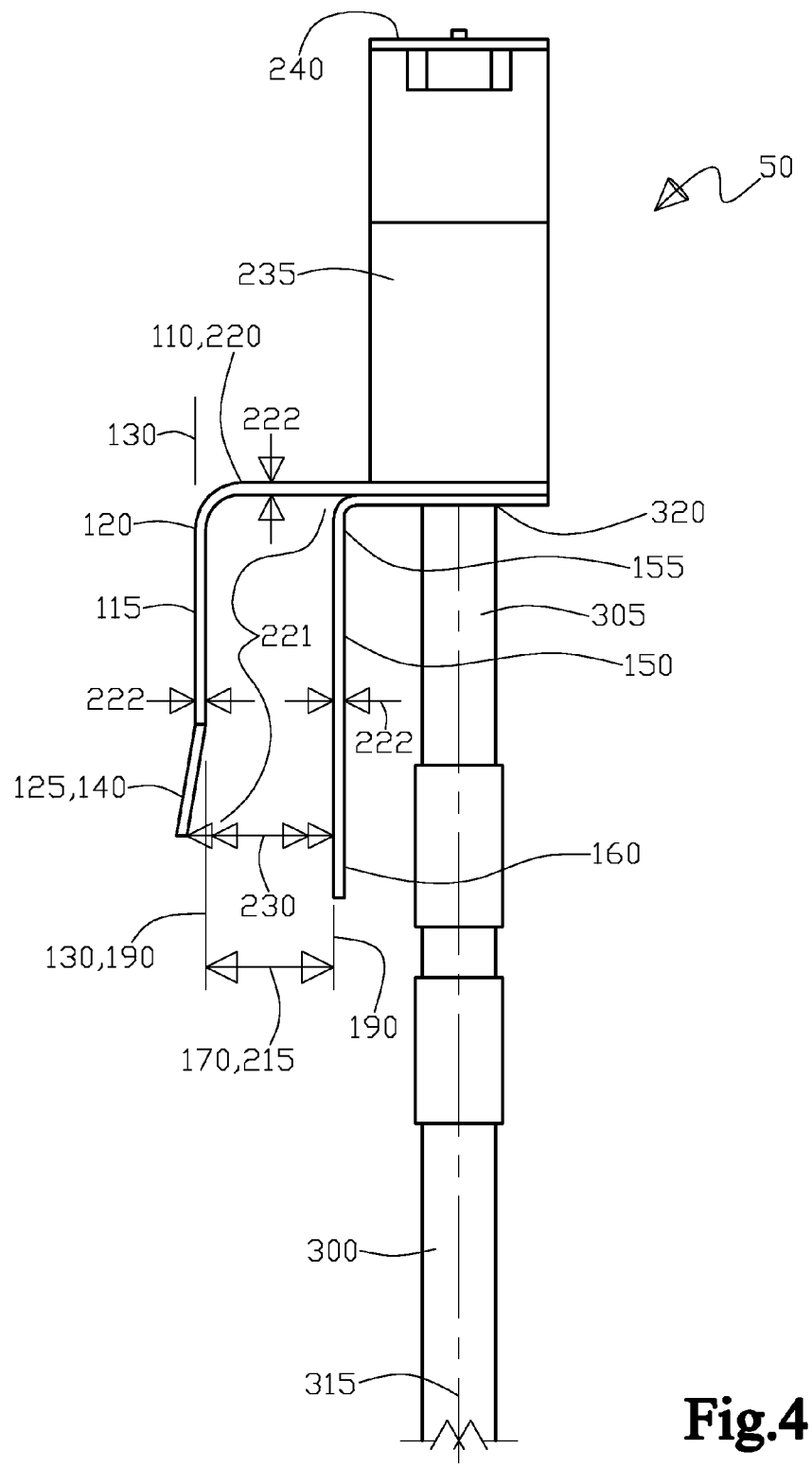
FIG. 4 shows a side elevation view 4-4 from FIG. 3 being opposite of what is shown in FIG. 2, of the camera support apparatus not installed on the fence structure including the first finger extension with a partial offset and the second finger extension, the connecting member, the camera mount interface with pivotal mounting, and the extension structure.
Figure 5:
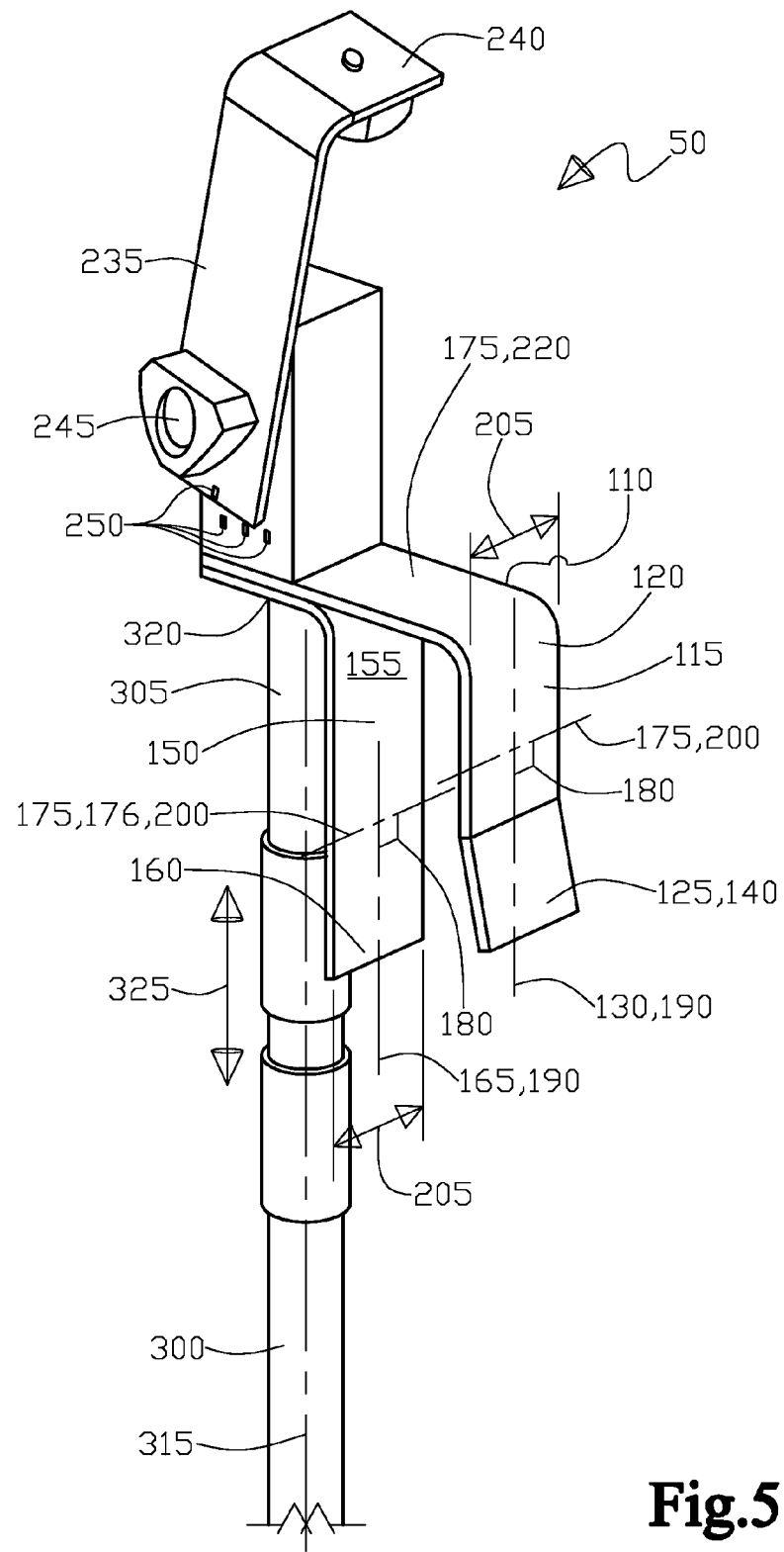
FIG. 5 shows a perspective view of the camera support apparatus as shown in FIG. 1, however, not installed in use upon the fence structure nor with the camera installed thus allowing greater pictorial clarity of the camera support apparatus including the first finger extension, the second finger extension, the connecting member, the camera mount interface with pivotal mounting, and the extension structure.

Continuing, FIG. 4 shows a side elevation view 4-4 from FIG. 3 being opposite of what is shown in FIG. 2, of the camera support apparatus 50 not installed on the fence structure 60 including the first finger extension 115 with a partial offset 140 and the second finger extension 150, the connecting member 220, the camera mount interface 235 with pivotal mounting 245, and the extension structure 300. Next, FIG. 5 shows a perspective view of the camera support apparatus 50 as shown in FIG. 1, however, not installed in use upon the fence structure 60 nor with the camera 51 installed thus allowing greater pictorial clarity of the camera support apparatus 50 including the first finger extension 115, the second finger extension 150, the connecting member 220, the camera mount interface 235 with pivotal mounting 245, and the extension structure 300.

Figure 6:
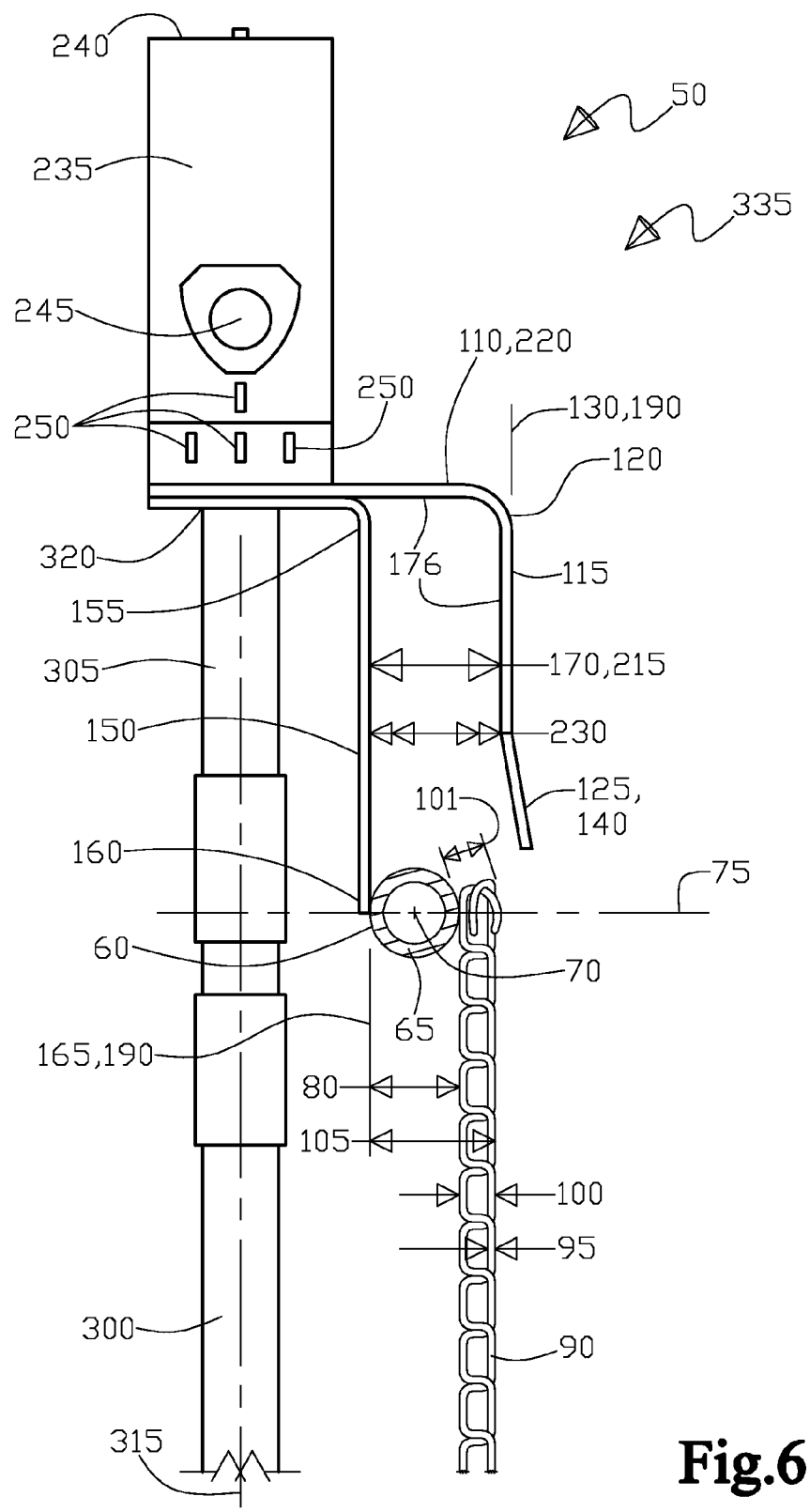
FIG. 6 shows the same side elevation view as FIG. 2 of the camera support apparatus except that the camera support apparatus is being positioned to have the first finger offset adjacent to the chain link wire mesh and the second finger distal portion in contact with the beam thus initiating the mounting or installation of the camera support apparatus onto the fence structure.

Yet, further in FIG. 6 shows the same side elevation view as FIG. 2 of the camera support apparatus 50 except that the camera support apparatus is being positioned 335 to have the first finger offset 140 adjacent to the chain link wire mesh 90 and the second finger distal portion 160 in contact with the beam 65 thus initiating the mounting or installation of the camera support apparatus 50 onto the fence structure 60. Continuing, FIG. 7 shows the continuation of FIG. 6 of the side elevation view of the camera support apparatus 50 being installed or mounted onto the fence structure 60, wherein the extension structure 300 is being manually pulled 345 in a directional motion away from the beam 65 to cause the connecting member 220 to approach 280 the beam 65 while the slip compressive fit 265 is occurring as between the first 115 and second 150 finger extensions plus the connecting member 220 and the beam 65 in conjunction with the chain link wire mesh 90.

Figure 7:
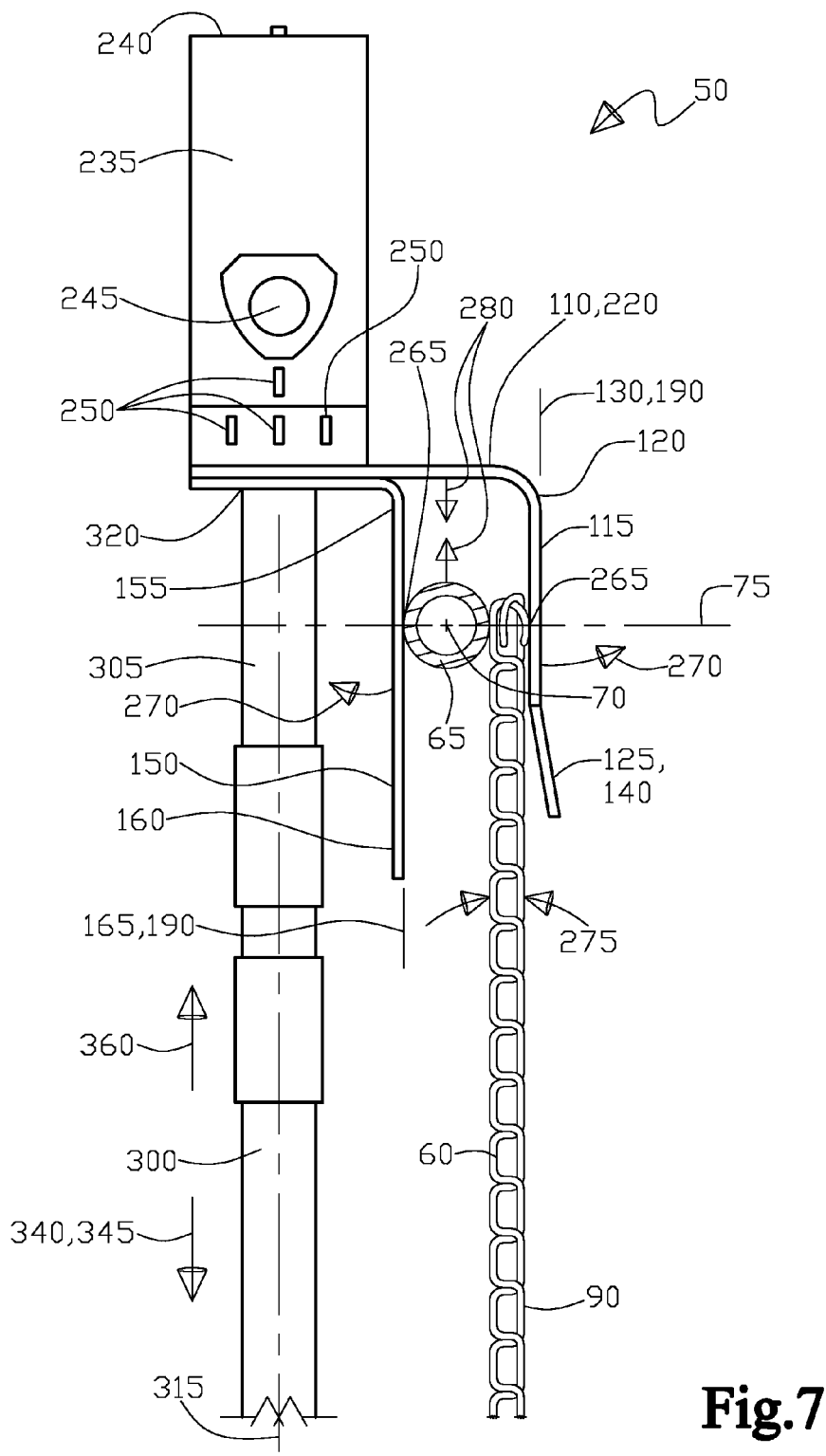
FIG. 7 shows the continuation of FIG. 6 of the side elevation view of the camera support apparatus being installed or mounted onto the fence structure, wherein the extension structure is being manually pulled in a directional motion away from the beam to cause the connecting member to approach the beam while the slip compressive fit is occurring as between the first and second finger extensions plus the connecting member and the beam in conjunction with the chain link wire mesh.
Figure 8:
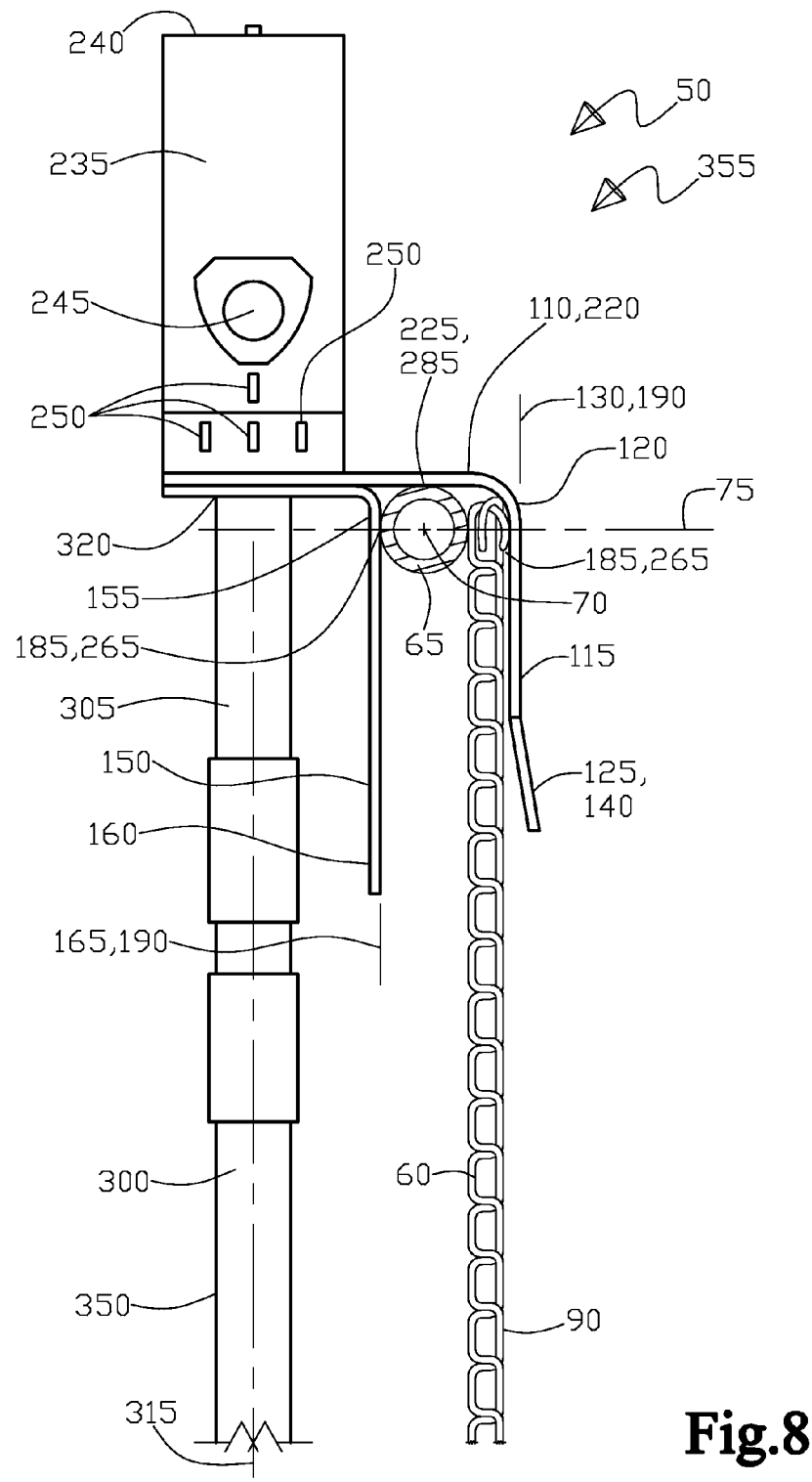
FIG. 8 is a continuation of FIG. 7 wherein the extension structure pulling has ceased and the connecting member has come into contact with the beam, thus completing the installation of the camera support apparatus onto the fence structure as shown in perspective in FIG. 1, wherein the slip compressive fit continues.
Figure 9:
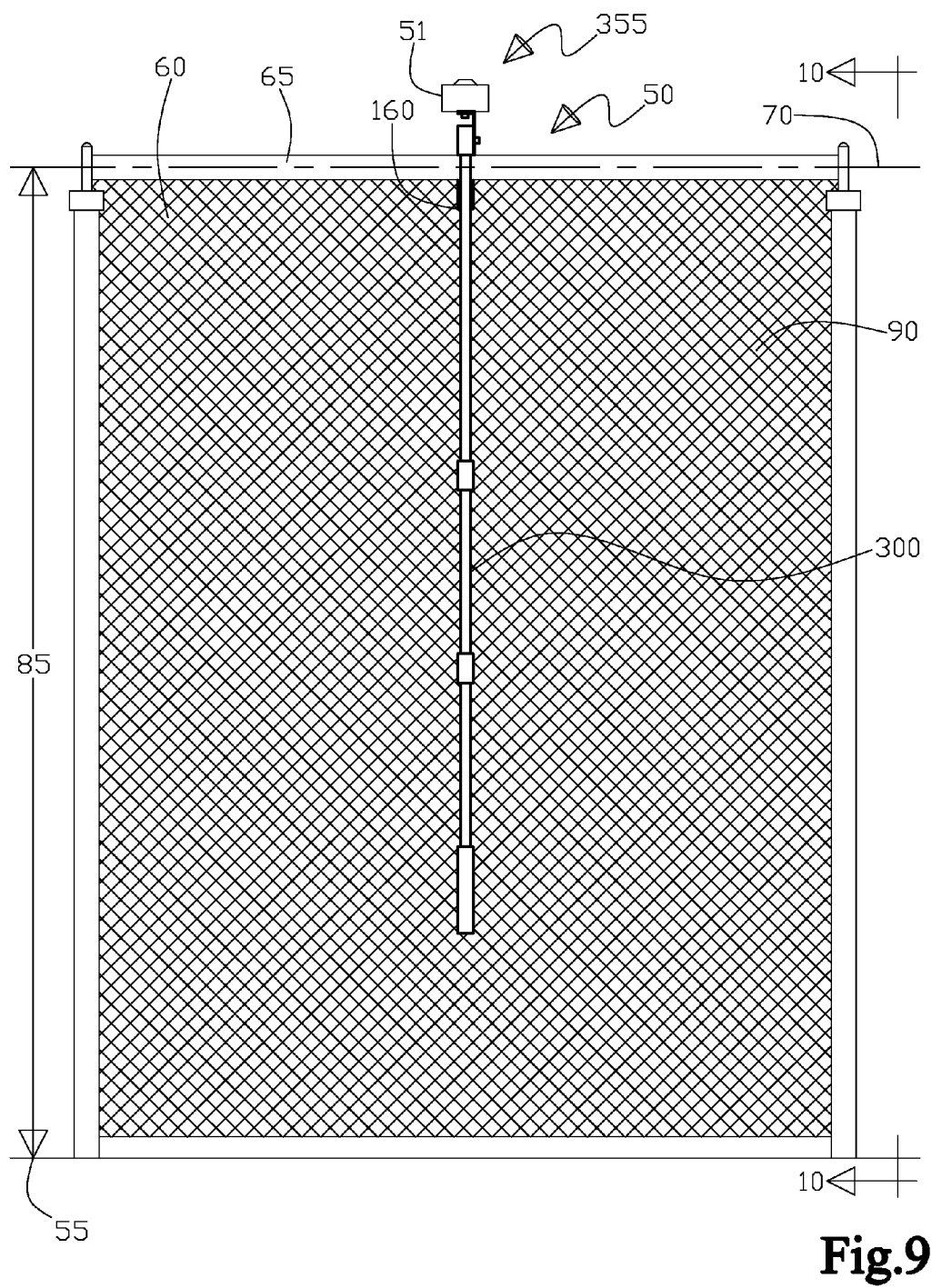
Figure 10:
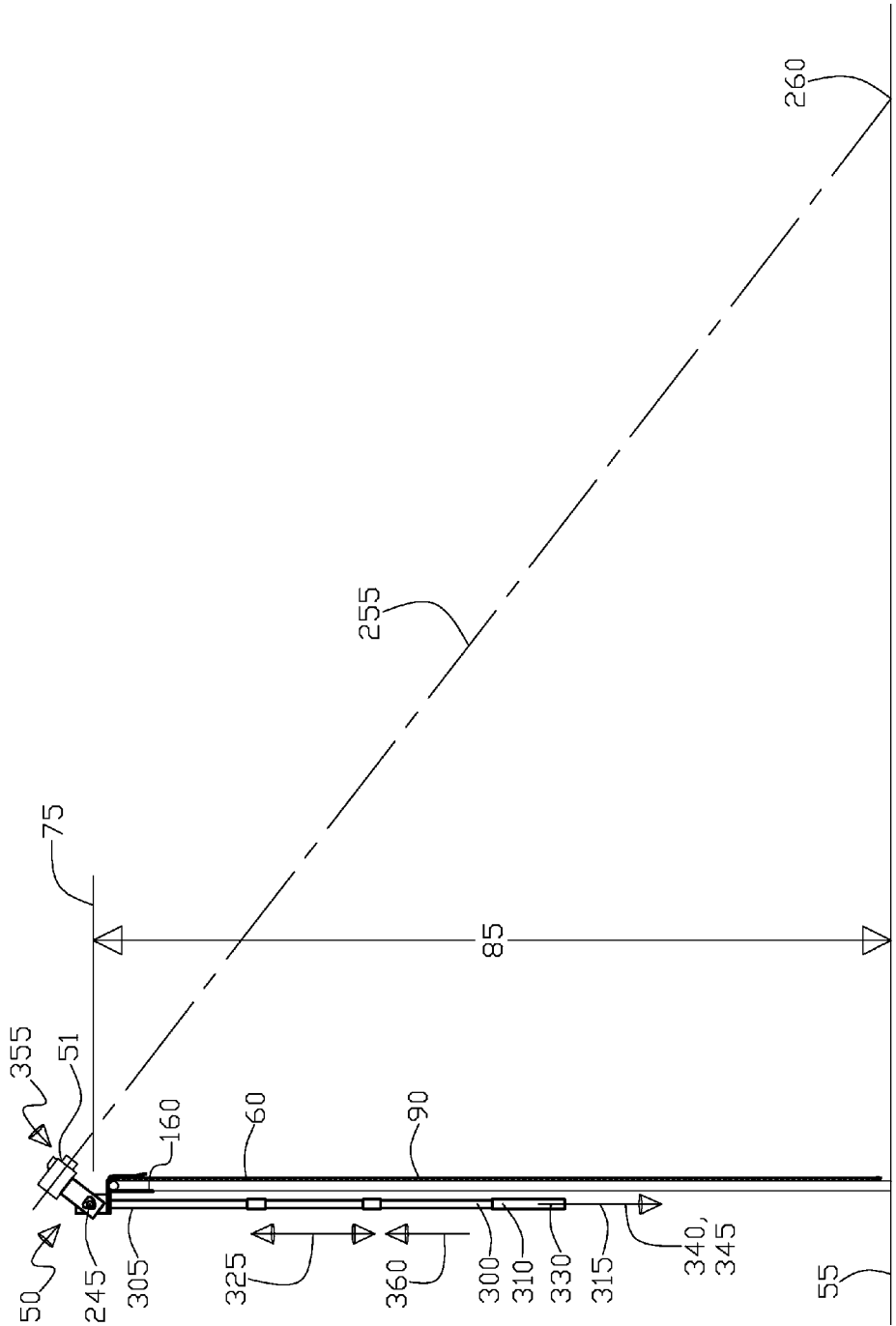
FIG. 10 shows a side elevation view 10-10 of FIG. 9 wherein again the camera support apparatus is fully mounted upon the fence structure with the camera in place more clearly showing the pivotal mounting of the camera mount interface with the camera line of focus shown intersecting the surface at a fixed point, thus giving the camera shot the proper downward angle to capture the sporting or other activity occurring at the fixed point.
Figure 11:
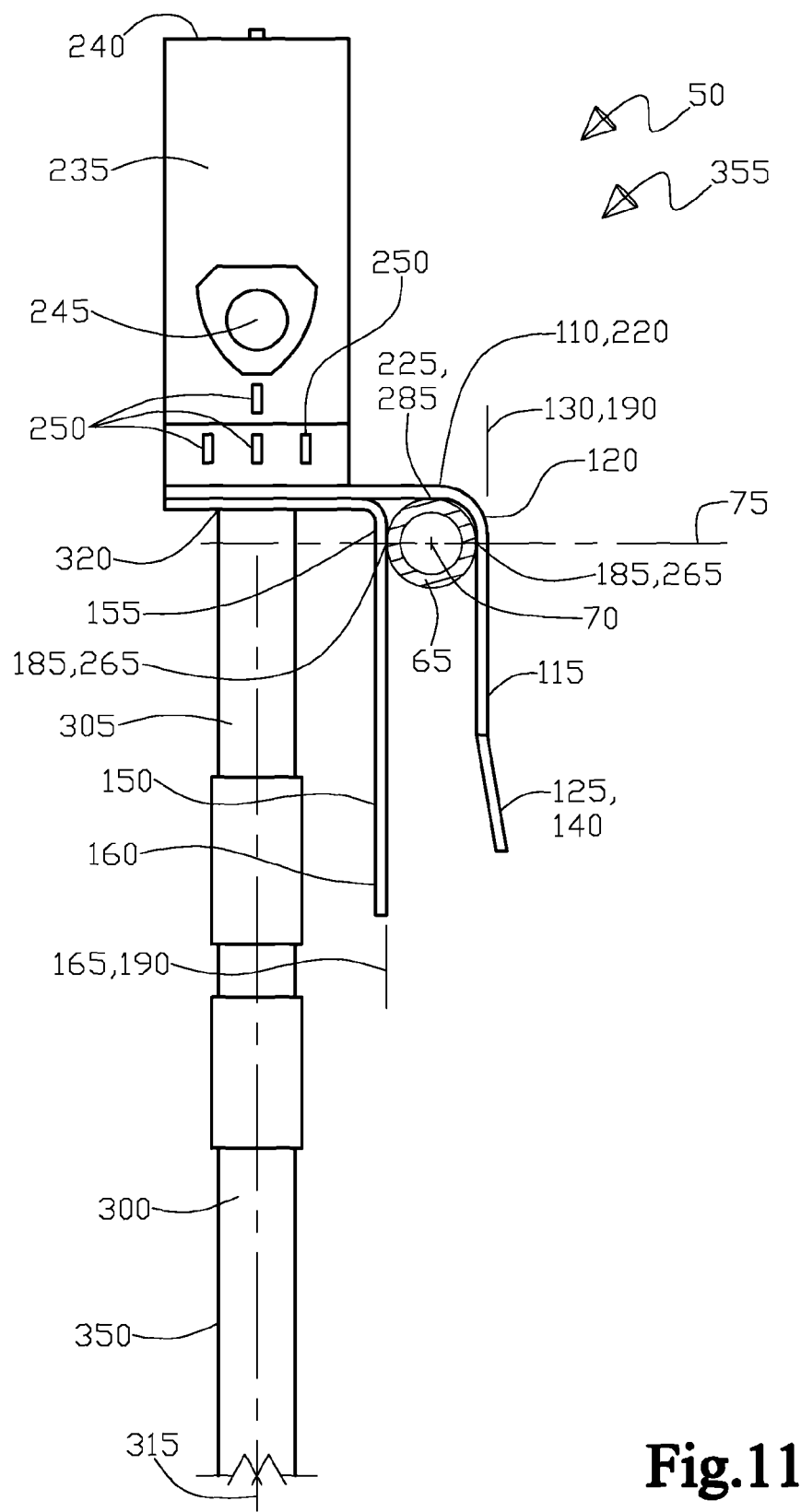
FIG. 11 is similar to FIG. 8 except the camera support apparatus is supported solely by the beam, thus the extension structure pulling has ceased and the connecting member has come into contact or adjacent with the beam, thus completing the installation of the camera support apparatus onto the beam, wherein the slip compressive fit continues.
Figure 12:
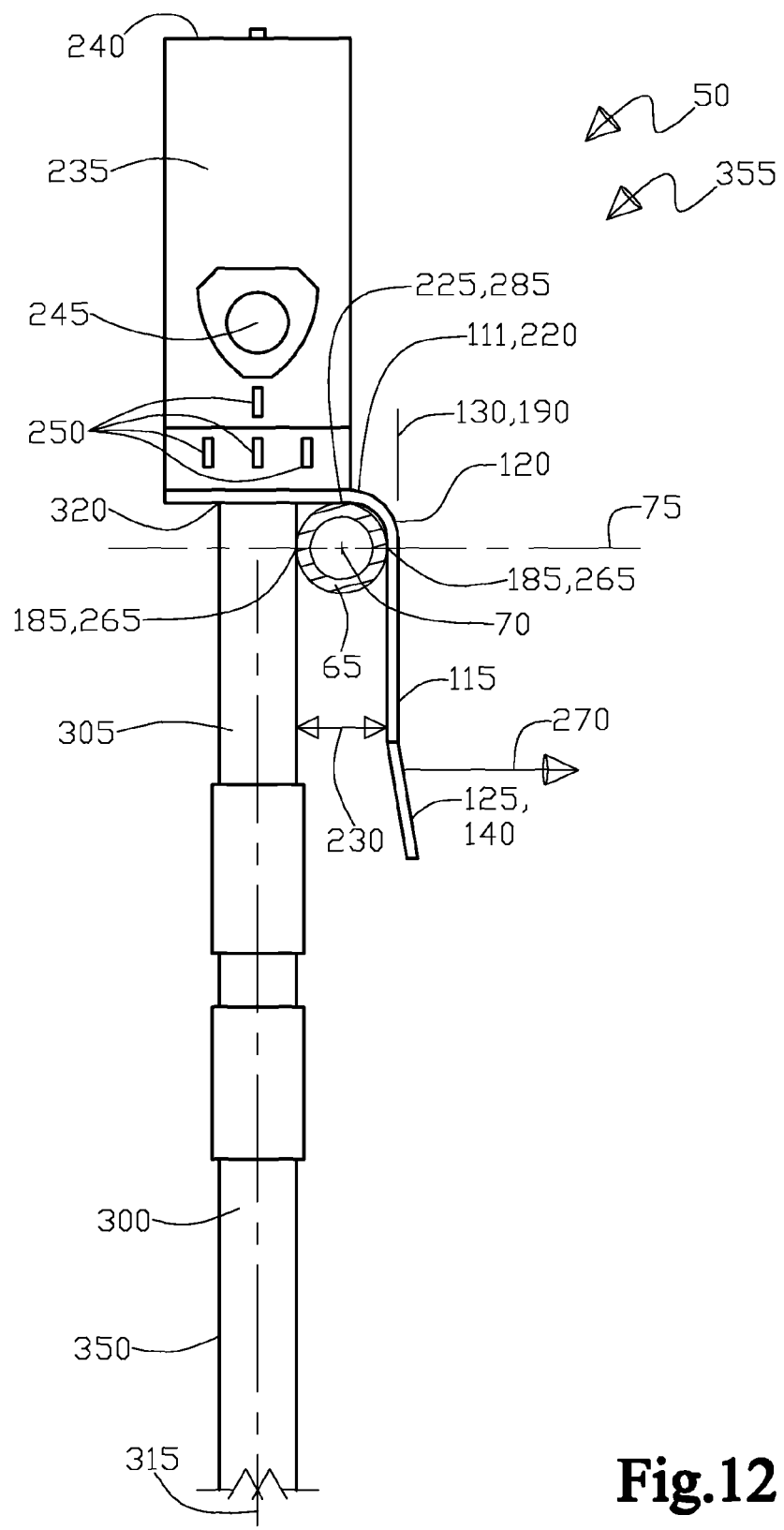
FIG. 12 is similar to FIG. 11 except the camera support apparatus is supported solely by the beam utilizing the first finger extension and the extension structure, wherein the extension structure pulling has ceased and the connecting member has come into contact or adjacent with the beam, thus completing the installation of the camera support apparatus onto the beam, wherein the slip compressive fit continues.

Moving onward, FIG. 8 is a continuation of FIG. 7 wherein the extension structure 300 pulling 345 has ceased 350 and the connecting member 220 has come into contact or adjacent 285 with the beam 65, thus completing the installation 355 of the camera support apparatus 50 onto the fence structure 60 as shown in perspective in FIG. 1, wherein the slip compressive fit 265 continues, holding the camera support apparatus 50 in place upon the fence structure 60. Further, FIG. 9 is a long range rear elevation view being opposite of the FIG. 3 front elevation view, wherein FIG. 9 shows the full extent of the beam height 85 above the surface 55, the whole of the fence structure 60, the camera support apparatus 50 with the camera 51 fully installed 355 upon the fence structure 60, noting that the camera support apparatus 50 can be installed on either side of the fence structure 60 by rotating the camera support apparatus 50 one hundred eighty (180) degrees in either case for the "bird's eye view" of the sporting event on the surface 55. Continuing, FIG. 10 shows a side elevation view 10-10 of FIG. 9 wherein again the camera support apparatus 50 is fully mounted 355 upon the fence structure 60 with the camera 51 in place more clearly showing the pivotal mounting 245 of the camera mount interface 235 with the camera line of focus 255 shown intersecting the surface 55 at a fixed point 260, thus giving the camera 51 shot the proper downward angle to capture the sporting activity occurring at the fixed point 260. Also, FIG. 11 is similar to FIG. 8 except the camera support apparatus 50 is supported solely by the beam 65, thus the extension structure 300 pulling 345 has ceased 350 and the connecting member 220 has come into contact or adjacent 285 with the beam 65, thus completing the installation 355 of the camera support apparatus 50 onto the beam 65, wherein the slip compressive fit continues 265. Further, FIG. 12 is similar to FIG. 11 except the camera support apparatus 50 is supported solely by the beam 65 utilizing the first finger extension 115 and the extension structure 300, wherein the extension structure 300 pulling 345 has ceased 350 and the connecting member 220 has come into contact or adjacent 285 with the beam 65, thus completing the installation 355 of the camera support apparatus 50 onto the beam 65, wherein the slip compressive fit continues 265.

In referring to FIGS. 2 through 5, the present invention of the camera support apparatus 50 that is supported by the fence structure 60 having the beam 65 with a longitudinal axis 70 and a perpendicular axis 75, wherein the beam 65 is adjacent to the chain link wire mesh 90, see FIGS. 1 and 6 through 10 for the fence structure 60 particulars. The camera support apparatus 50 includes an inverted "U" shaped flexible member 110 including the first finger extension 115 with a first proximal end portion 120 and an opposing first distal end portion 125 with a first extension axis 130 therebetween. Also included in the camera support apparatus 50 is a second finger extension 150 with a second proximal end portion 155 and an opposing second distal end portion 160 with a second extension axis 165 therebetween. Wherein the first 130 and second 165 extension axes are substantially parallel 170 to one another, further the first 120 and second 155 proximal end portions are each joined by a connecting member 220, wherein a combination of the first 115 and second 150 fingers, and the connecting member 220 have a stiffness 230 "K" factor range of about ten (10) to thirty (30) pounds per inch at the first 125 and second 160 distal end portions, see FIGS. 2 and 4 in particular.

Also included in the camera support apparatus 50 is a camera mount interface 235 extending from the connecting member 220, the camera mount interface 235 is positioned opposite of the first 115 and second 150 fingers, see FIGS. 1 through 5. The camera mount interface 235 is adapted to removably engage 240 the camera 51, wherein the first 115 and second 150 fingers and the connecting member 220 have a slip compressive fit 265 removable engagement via the stiffness 230 with a combination of the beam 65 and the chain link wire mesh 90, see FIGS. 6, 7, and 8. Wherein, operationally the combination of first 115 and second 150 fingers and the connecting member 220 deflect outward 270 dimensionally a greater amount to the chain link wire mesh 90 deflecting inwardly 275 as the connecting member 220 and the beam 65 approach 280 one another eventually coming into contact or adjacent 285 with one another to facilitate the slip compressive fit 265 by virtue of friction as between the first 115 and second 150 fingers and the beam 65 and the chain link wire mesh 90 to help prevent movement of a moment 290 about the beam perpendicular axis 75 of the camera support apparatus 50, see FIG. 1 in particular. The preferred materials of construction for the first finger extension 115, the second finger extension 150, and the connecting member 220 are aluminum or a suitable equivalent. The preferred materials of construction for the camera mount interface 235 is a combination of aluminum, plastic, knobs, #8 mounting screws, an E-clip, and a ¼ inch by 20 threads per inch by 1 inch long bolt to hold the camera 51 with a cork square sheet to cushion the camera 51 mounting or a suitable equivalent.

In reference to the separate dimension deflections outward 270 and inward 275, the gap distance 215, see FIGS. 2 and 4, as shown in the free state, i.e. without the slip compressive fit 265, the gap distance 215 is about equal to two (2.0) inches, and further referencing FIGS. 6, 7, and 8, wherein the beam 65 outside dimension 80 is about one point six-five-three (1.653) inches and the chain link wire mesh 90 thickness 100 (uncompressed) is equal to about zero point four-six-two (0.462) inches with an individual wire diameter 95 of about zero point one-one-six (0.116) inches, see FIG. 6 in particular. Thus, the combination dimension 105 of the beam outside dimension 80 and the chain link wire mesh 90 thickness 100 is equal to 1.653 plus 0.462 equals 2.115 inches for dimension 105, see FIG. 6. Further as shown in FIG. 6, the gap dimension 215 is about 2.0 inches, thus as the slip compressive fit 265 is initiated by virtue of the offset 140 encompassing the chain link wire mesh 90 and the second finger extension encompassing the beam 65 outside dimension, in going from FIGS. 6 to 7. Thus this the gap 215 at 2.0 inches is being pulled 345 over the combination 105 at 2.115 inches means that the first 115 and second 150 finger extensions are going to spread apart 270 and the chain link wire mesh 90 is going to compress 275, wherein in FIG. 8, from actual empirical testing, the majority of deflection is between the first 115 and second 150 fingers being about a ratio of 300 to 1, in other words the first 115 and second 150 fingers will deflect outwardly 270 about 0.115 inches and the chain link wire mesh 90 will deflect inwardly 275 about 0.0004 inches, which a compressive fit 265 in pounds force will equal about twenty (20) pounds per inch stiffness 230 times 0.115 inches equals about 2.3 pounds compressive force 265 from the first 115 and second 150 fingers onto the fence structure 60. Further as an alternative, the first 115 and second 150 fingers could solely compressively have a slip fit 265 on the beam 65 outside dimension 80 without the chain link wire mesh 90, see specifically FIG. 11, being sized for an equal compressive force of about 2.3 pounds via having the same outward deflection 270 of about 0.115 inches. Further it is assumed that the beam 65 outside dimension 80 does not compress an amount that would have any influence on the outward deflection 270 calculations of the fingers 115 and 150 respectively.

The calculations are as follows; the basic cantilever beam deflection equals the force at the free end (in pounds) times the beam length (in inches) to the third power or cubed all divided by the factor "3" times the modulus of elasticity (in pounds per square inch) times the area moment of inertia (in inches to the fourth power) wherein the deflection is in inches. Thus for the chain link wire mesh 90 following the above equation; 2.3 pounds force times 0.5 inches cubed (assumed to be the free projection 101 of the wire 90 from the beam 65, see FIG. 6) all divided by "3" times 29 million pounds per square inch (assumed modulus of elasticity for steel) times 0.25 times 3.14 (pi) times [0.116 inches (element 95) divided by 2] to the fourth power which equals about 0.0004 inches. Thus for the first 115 and second 150 fingers combined with the connecting member 220 following the above equation; 2.3 pounds force times 5.5 inches cubed (assumed to be the free projection 221 of the first finger 115 and connecting member 220, see FIG. 4) all divided by "3" times 10 million pounds per square inch (assumed modulus of elasticity for aluminum) times 0.083 (factor) times 1.5 inches (element 205, see FIG. 5) times 0.125 inches (element 222, see FIG. 4) to the third power which equals about 0.053 inches times two (due to second finger 150 deflecting also) equals about 0.11 inches thus coinciding with the empirical test data with a measured deflection of 0.115 inches. Note that in the case of just the connecting member 220 and the first finger 115 being used in conjunction with the extension structure 300, as shown in FIG. 12, the outward 270 deflection of the first finger 115 and the connecting member 220 will be about 0.115 inches, thus to equal the outward deflection 270 of the first 115 and second 150 fingers combined with the connecting member 220, see FIGS. 8 and 11, ultimately resulting in the same compressive force of 2.3 pounds of fit 265 for the same friction as between the beam 65 and the first finger 115 and in the case of FIG. 12 the extension structure 300, wherein this compressive force of fit 265 was shown by testing to be sufficient for holding the camera support apparatus 50 upon the structure 60, as shown in FIGS. 8, 11, and 12, even when the connecting member 220 is not in contact with the beam 65, as shown in FIG. 7.

On the first 115 and second 150 fingers they can be in the form of a substantially flat sided blade cross sectional profile 175 that is perpendicular 180 to each of the first 130 and second 165 extension axes, wherein operationally a portion of the first 176 and second 176 finger flat sides are in frictional contact 185 with the beam 65 and the chain link wire mesh 90, see FIGS. 1 and 8. Further, each substantially flat sided blade 175 has a major axis 190 and a minor axis 200, wherein a major length 195 of the major axis 190 is about two point five (2.5) times a minor length 205 of the minor axis 200, wherein operationally the major axis 190 is positioned substantially perpendicular 210 to the beam longitudinal axis 70, see FIGS. 1 and 5. As previously stated in the deflection analysis for both the outward deflection 270 and inward deflection 275, the flat sided cross sectional profile 175 having the thickness 222 preferably at about 0.125 inches and the width or minor length 205 preferably at about 1.5 inches determines the area inertia of the first 115 and second 150 finger extensions and also the connecting member 220 thus determining the deflections 270 and 275 respectively that ultimately determine the compressive fit of about 2.3 pounds compressive force 265 as previously discussed.

In looking at FIGS. 2, 4, and 5 through 8, for the camera support apparatus 50 the second finger extension 150 has a length (along the second extension axis 165) that is optionally greater than a length of the first finger extension 115 (along the first extension axis 130) to operationally to help facilitate a positioning start of the slip compressive fit 265, as best shown in FIG. 6, by the user first having the second distal end 160 contact the beam 65 to properly position the offset 140 in relation to the chain link wire mesh 90, as the offset 140 and chain link wire mesh 90 positioning is not always clearly in view for the user, who is located on the second finger extension 150 side of the fence structure 60 during the installation 355 and removal 360 of the camera apparatus 50 from the fence structure 60. In addition, the connecting member 220 is also in the form of a substantially flat sided blade 175 that has a matching profile to the first 115 and second 150 fingers substantially flat sided blade cross sectional profiles 175, wherein operationally a portion of the connecting member 220 flat side 176 is in contact or adjacent 285 with the beam 65 forming a contact area parallel to the beam longitudinal axis 70, wherein operationally to further help prevent movement of a moment 290 about the beam perpendicular axis 75 of the camera support apparatus 50, see in particular FIGS. 1 and 8.

Looking particularly at FIGS. 4 through 8, as an installation positioning 335 enhancement, see specifically FIG. 6, the first finger 115 distal end portion 125 is partially offset 140 away from the second finger 150 being operational to initiate and progressively increase the slip compressive fit 265, see specifically FIGS. 6 and 7, as the connecting member 220 and the beam 65 approach 280 one another. More particularly, the offset 140 consumes about one-third of a first finger length 135 along the first extension axis 130, see FIG. 2 in particular. Preferably the first finger length 135 is about 3.5 inches. Further, on the offset 140, the offset 140 increases a gap distance 215 as between said first and second fingers by about ten (10) percent to preferably adequately provide clearance for the first distal end portion 125 to clear the chain like wire mesh 90, see FIG. 6.

As a positioning installation 335 enhancement when the beam 65 is a greater height distance 85 above the surface 55 than a user can typically reach without the aid of a ladder, then optionally the camera support apparatus 50 can further comprise an extension structure 300 with a proximal end portion 305 and an opposing distal end portion 310 with a lengthwise axis 315 therebetween. The extension structure 300 proximal end portion 305 is removably engagable 320 to the flexible member 110 preferably via Acme type threads and positioned such that the extension structure 300 distal end portion 310 extends beyond the second finger distal end portion 160, see in particular FIGS. 9 and 10. Wherein operationally, the extension structure distal end portion 310 as a hand grip 330 facilitates the slip compressive fit 265 manually when a user is a remote distance 85 away from the beam 65, say for instance on a tennis court fence structure 60 that is about twelve feet for distance 85, further operationally the extension structure 300 helps also prevent movement of a moment 295 about the beam longitudinal axis 70 by virtue of being a stabilizing type bar by having a beneficial lower weight and a high polar moment of inertia about the beam perpendicular axis 75, as best shown in FIGS. 1 and 10. Further on the extension structure 300 an option to be selectably adjustable 325 in a length as between the extension structure proximal end portion 305 and the extension structure distal end portion 310 along the lengthwise axis 315, this is accomplished preferably by a telescoping arrangement with collet type circumferential clamps of the extension structure 300, similar to a camera tripod, see FIGS. 9 and 10 wherein preferably the extension structure 300 in constructed of aluminum.

Further to the camera mount 235 includes a selectively adjustable pivotal mounting 245 for the camera 51 to operationally focus 255 on a fixed point 260 with varying beam 65 heights 85 above the surface 55, see FIG. 10, as the camera support apparatus 50 typically places the camera 51 in an overhead position while shooting to a fixed point 260 on a surface 55. Thus, for the line of focus 255 to be selectively adjustable the optional pivotal mounting 245 further includes crayon pre-marked angular settings 250 to facilitate a line of focus 255 from the camera 51 to the fixed point 260 on a playing surface 55 with a given beam height 85 above the surface 55, in other words for a given beam 65 height 85 of as an example of twelve feet for a tennis court fence structure, the pre markings allow the camera 51 angle 255 to be preset to correctly focus upon the desired spot 260 on the surface 55.

Referring in particular to FIG. 12, the camera support apparatus 50, supported by a fence structure 60 having a beam 65 with a longitudinal axis 70 and a perpendicular axis 75, with the camera support apparatus 50 includes an inverted "L" shaped flexible member 111 having a first finger extension 115 with a first proximal end portion 120 and an opposing first distal end portion 125 with a first extension axis 130 therebetween and a connecting member 220. Also included is an extension structure 300 with a proximal end portion 305 and an opposing distal end portion 310 with a lengthwise axis 315 therebetween. Wherein the extension structure 300 proximal end portion 305 is removably engagable 320 to the connecting member 220 and positioned such that the extension structure 300 distal end portion 310 extends beyond the first finger 115 distal end portion 125 and the lengthwise axis 315 and the first extension axis 130 are substantially parallel to one another. Wherein a combination of the first finger 115 and the connecting member 220 have a stiffness 230 "K" factor range of about ten (10) to thirty (30) pounds per inch as between the first distal end portion 125 and the extension structure 300 proximal end portion 305.

Further included as shown in FIG. 12, for the camera support apparatus 50 is a camera mount interface 235 extending from the connecting member 220, the camera mount interface 235 is positioned opposite of the first finger 115. Also, the camera mount interface 235 is adapted to removably engage 240 a camera 51. The first finger 115 and the extension structure 300 proximal end portion 305 have a slip compressive fit 265 removable engagement via the stiffness 230 with the beam 65. Wherein operationally, the combination of first finger 115 and the connecting member 220 deflect outward dimensionally 270 as the connecting member 220 and the beam 65 approach 280, see FIG. 7 for an example, eventually becoming adjacent 285 with one another to facilitate the slip compressive fit 265 by virtue of friction as between the first finger 115 and the beam 65 and the extension structure 300 proximal end portion 305 and the beam 65 to help prevent movement of a moment 290 about the beam 65 perpendicular axis 75 of the camera support apparatus 50.

METHOD OF USE

Looking in particular at FIG. 1, and FIGS. 6 through 10, a method of acquiring camera 51 images of a sporting or other event is disclosed, utilizing camera 51 support by a fence structure 60 having the beam 65 with a longitudinal axis 70 and a perpendicular axis 75, wherein the beam 65 is adjacent to a chain link wire mesh 90, comprising the steps of firstly providing a camera support apparatus 50 as previously described. Next a step of positioning 335 the second finger distal end portion 160 in contact with the beam 65 and simultaneously positioning 335 the first finger offset 140 adjacent to the chain link wire mesh 90 via manual movement 340 of the extension structure 300 distal end portion 310, see FIG. 6.

Further, a step of pulling 345 the extension structure 300 distal end portion 310 manually away from the beam 65 to initiate the first 115 and second 150 fingers and the connecting member 220 have a slip compressive fit 265 removable engagement via the stiffness 230 with a combination of the beam 65 and the chain link wire mesh 90. The offset 140 being operational to progressively increase the slip compressive fit 265 as the connecting member 220 and the beam 65 approach 280 one another, see FIG. 7, wherein the combination of first 115 and second 150 fingers and the connecting member 220 deflect outward 270 dimensionally an amount greater than the chain link wire mesh 90 deflecting inwardly 275 as the connecting member 220 and the beam 65 approach 280 one another, This is to facilitate the slip compressive fit 265 by virtue of friction as between the first 115 and second 150 fingers and the beam 65 and the chain link wire mesh 90, a portion of the first 115 and second 150 fingers flat sides 176 are in frictional contact 185 with the beam 65 and the chain link wire mesh 90 and eventually a portion of the connecting member 220 flat side 176 is in contact of adjacent 285 with the beam 65 forming a contact area parallel to the beam 65 longitudinal axis 70, see FIG. 8. Thus ceasing 350 the pulling step, wherein the camera support apparatus 50 is installed in place 355 upon the fence structure 60 to help prevent movement of a moment 290 about the beam perpendicular axis 75 of the camera support apparatus 50 and to help prevent movement of a moment 295 about the beam longitudinal axis 70 of the camera support apparatus 50, see FIG. 1.

Further, an alternate step of pushing 360 the extension structure 300 distal end portion 310 toward the beam 65 to remove the camera support structure 50 from the fence structure 60.

The camera support apparatus 50 is typically used by attaching it to an object or fence structure 60. By having the substantially parallel 170 first 115 and second 150 flexible fingers, the camera support apparatus 50 can actually compressively clamp 265 onto the structure such as a fence 60, see FIGS. 1 and 6-10, at which point the apparatus 50 can be positioned either vertical in using the lengthwise axis 315, see FIG. 9, or angled about moment 290, see FIG. 1, wherein the lengthwise axis 315 would deviate from vertical, to further accommodate any other requirements of the videographer and/or cameraman, or in the case of a sloping fence, branch or other object, the compressive action 265 of the first 115 and second 150 fingers provides enough frictional force through the stiffness 230 as previously discussed to keep the apparatus 50 in whatever angular position it is set to, usually to obtain a level view of the sporting event even if the camera is mounted crooked in the apparatus 50.

Also, the apparatus 50 can also be hung on a wire, branch, or other overhead object that is smaller in diameter than the fence beam 65 and the chain link wire mesh 90 thickness 100 combined by virtue of having wide, flat 176 fingers 115 and 150 that cause the apparatus 50 to contact or adjacent 285 to sit flat upon the beam 65. Further the apparatus 50 can be hung on the beam 65 alone, as shown in FIG. 11, If more stability is required where the compressive 265 action is not possible and the mounting object or structure 60 is not as stable as desired, a small weight or even a bungee cord can be attached to the distal end portion 310 to exert a downward pressure or force toward the surface 55, thus helping to hold the apparatus 50 in place. Alternatively, the camera support apparatus 50 can be installed as in FIG. 12, using the first finger 115, the connecting member 220, and the extension structure 300 in position onto the beam 65.

The first time the camera support apparatus 50 is used in a new location, other than a standard tennis court, the method of mounting includes an initial guess as to the angle to set the pivotal mounting 245 at, see FIG. 10, then raising the camera support apparatus 50 in its installed state i.e., the top of the fence structure 60, shooting a couple of seconds of video and taking the camera support apparatus 50 down, reviewing and adjusting the pivotal 245 camera 51 position, and then replacing the camera support apparatus 50 on the supporting object (i.e. the fence structure 60). This is repeated as necessary until the correct view or line of focus 255 is obtained, see FIG. 10. The camera mount interface 235 bracket is typically pivotally 245 tilted to look down of have the line of focus 255 onto the sports event being recorded, depending on the height 85 of the object 60 to which the camera support apparatus 50 is attached. The camera mount interface 235 has a clearly defined mark 250 set into one end that can be lined up with another mark 250 so that a pre-determined angle 255 can be set, see FIGS. 1, 5 through 8, and 10. In the case of a tennis court, the preferred angle is approximately 15 degrees, i.e. the intersection of the surface 55 and line of focus 255, see FIG. 10, and this is permanently marked 250 on the camera mount interface 235. Once the camera support apparatus 50 has been used in any particular location, the mount interface 235 can be marked 250, so that the camera pivotal mounting 245 can be correctly positioned without having to shoot, review, and adjust the next time the camera 51 is set up. When used with smaller cameras 51, the fingers 115 and 150 of the camera support apparatus 50 can also be inserted into the chain link mesh fabric 90 of a typical fence structure 60, being below the beam 65, allowing for a view through the chain link wire mesh 90 while at the same time protecting the camera 51 from any errant balls from the sporting event. The camera mount 235 preferably has a standard ¼"×20 screw so that it will fit almost any standard video or other camera 51.

CONCLUSION

Accordingly, the present invention of a camera support apparatus 50 has been described with some degree of particularity directed to the embodiments of the present invention. It should be appreciated, though, that the present invention is defined by the following claims construed in light of the prior art so that modifications or changes may be made to the exemplary embodiments of the present invention without departing from the inventive concepts contained therein.

The invention claimed is:

1. A camera support apparatus, supported by a fence structure having a beam with a longitudinal axis and a perpendicular axis, wherein the beam is adjacent to a chain link wire mesh, said camera support apparatus comprising:
   (a) an inverted "U" shaped flexible member including a first finger extension with a first proximal end portion and an opposing first distal end portion with a first extension axis therebetween, a second finger extension with a second proximal end portion and an opposing second distal end portion with a second extension axis therebetween, wherein said first and second extension axes are substantially parallel to one another, further wherein said first and second proximal end portions are each joined by a connecting member, wherein a combination of said first and second fingers, and said connecting member have a stiffness K factor range of about ten to thirty pounds per inch at said first and second distal end portions; and
   (b) a camera mount interface extending from said connecting member, said camera mount interface is positioned opposite of said first and second fingers, said camera mount interface is adapted to removably engage a camera, wherein said first and second fingers and said connecting member have a slip compressive fit removable engagement via said stiffness with a combination of the beam and the chain link wire mesh, wherein operationally said combination of first and second fingers and said connecting member deflect outward dimensionally an amount greater than the chain link wire mesh deflecting inwardly as said connecting member and the beam approach one another eventually becoming adjacent with one another to facilitate said slip compressive fit by virtue of friction as between said first and second fingers and the beam and the chain link wire mesh to help prevent movement of a moment about the beam perpendicular axis of said camera support apparatus.

2. A camera support apparatus according to claim 1 wherein each of said first and second fingers are in the form of a substantially flat sided blade cross sectional profile that is perpendicular to each of said first and second extension axes, wherein operationally a portion of said first and second finger flat sides are in frictional contact with the beam and the chain link wire mesh.

3. A camera support apparatus according to claim 2 wherein each substantially flat sided blade has a major axis and a minor axis, wherein a major length of said major axis is about two and a half times a minor length of said minor axis, wherein operationally said major axis is positioned substantially perpendicular to the beam longitudinal axis.

4. A camera support apparatus according to claim 2 wherein said second finger extension has a length that is greater than a length of said first finger extension to operationally to help facilitate a positioning start of said slip compressive fit.

5. A camera support apparatus according to claim 2 wherein said connecting member is in the form of a substantially flat sided blade that has a matching profile to said first and second fingers substantially flat sided blade cross sectional profiles, wherein operationally a portion of said connecting member flat side is in contact with the beam forming a contact area parallel to the beam longitudinal axis, wherein operationally to further help prevent movement of a moment about the beam perpendicular axis of said camera support apparatus.

6. A camera support apparatus according to claim 5 wherein said first finger distal end portion is partially offset away from said second finger being operational to progressively increase said slip compressive fit as said connecting member and the beam approach one another.

7. A camera support apparatus according to claim 6 wherein said offset consumes about one-third of a first finger length along said first extension axis.

8. A camera support apparatus according to claim 7 wherein said offset increases a gap distance as between said first and second fingers by about ten percent.

9. A camera support apparatus according to claim 6 further comprising an extension structure with a proximal end portion and an opposing distal end portion with a lengthwise axis therebetween, wherein said extension structure proximal end portion is removably engagable to said flexible member and positioned such that said extension structure distal end portion extends beyond said second finger distal end portion, wherein operationally said extension structure distal end portion as a hand grip facilitates said slip compressive fit manually when a user is a remote distance away from the beam, further operationally said extension structure helps also prevent movement of a moment about the beam longitudinal axis.

10. A camera support apparatus according to claim 9 wherein said extension structure is selectably adjustable in a length as between said extension structure proximal end portion and said extension structure distal end portion along said lengthwise axis.

11. A camera support apparatus according to claim 6 wherein said camera mount includes a selectively adjustable pivotal mounting for the camera to operationally focus on a fixed point with varying beam heights above a surface.

12. A camera support apparatus according to claim 11 wherein said pivotal mounting further includes pre-marked angular settings to facilitate a line of focus from the camera to the fixed point on a playing surface with a given beam height above the surface.

13. A camera support apparatus, supported by a fence structure having a beam with a longitudinal axis and a perpendicular axis, said camera support apparatus comprising:
 (a) an inverted "U" shaped flexible member including a first finger extension with a first proximal end portion and an opposing first distal end portion with a first extension axis therebetween, a second finger extension with a second proximal end portion and an opposing second distal end portion with a second extension axis therebetween, wherein said first and second extension axes are substantially parallel to one another, further wherein said first and second proximal end portions are each joined by a connecting member, wherein a combination of said first and second fingers, and said connecting member have a stiffness K factor range of about ten to thirty pounds per inch at said first and second distal end portions; and
 (b) a camera mount interface extending from said connecting member, said camera mount interface is positioned opposite of said first and second fingers, said camera mount interface is adapted to removably engage a camera, wherein said first and second fingers and said connecting member have a slip compressive fit removable engagement via said stiffness with the beam, wherein operationally said combination of first and second fingers and said connecting member deflect outward dimensionally as said connecting member and the beam approach one another eventually becoming adjacent with one another to facilitate said slip compressive fit by virtue of friction as between said first and second fingers and the beam to help prevent movement of a moment about the beam perpendicular axis of said camera support apparatus.

14. A method of acquiring camera images of an event, utilizing camera support by a fence structure having a beam with a longitudinal axis and a perpendicular axis, wherein the beam is adjacent to a chain link wire mesh, comprising the steps of:
 (a) providing a camera support apparatus that includes an inverted "U" shaped flexible member including a first finger extension with a first proximal end portion and an opposing first distal end portion with a first extension axis therebetween, a second finger extension with a second proximal end portion and an opposing second distal end portion with a second extension axis therebetween, wherein said first and second extension axes are substantially parallel to one another, said first finger distal end portion is partially offset away from said second finger, wherein each of said first and second fingers are in the form of a substantially flat sided blade cross sectional profile that is perpendicular to each of said first and second extension axes, further wherein said first and second proximal end portions are each joined by a connecting member, wherein said connecting member is in the form of a substantially flat sided blade that has a matching profile to said first and second fingers substantially flat sided blade cross sectional profiles, wherein a combination of said first and second fingers, and said connecting member have a stiffness K factor range of about ten to thirty pounds per inch at said first and second distal end portions, said second finger extension having a length that is longer than a length of said first finger extension, said camera support apparatus also including a camera mount interface extending from said connecting member, said camera mount interface is positioned opposite of said first and second fingers, said camera mount interface is adapted to removably engage a camera, additionally included in said camera support apparatus is an extension structure with a proximal end portion and an opposing distal end portion with a lengthwise axis therebetween, wherein said extension structure proximal end portion is removably engagable to said flexible member and positioned such that said extension structure distal end portion extends beyond said second finger distal end portion, wherein said first and second fingers and said connecting member have a slip compressive fit removable engagement via said stiffness with a combination of the beam and the chain link wire mesh, said offset being operational to progressively increase said slip compressive fit as said connecting member and the beam approach one another wherein operationally said combination of first and second fingers and said connecting member deflect outward dimensionally an amount greater than the chain link wire mesh deflecting inwardly as said connecting member and the beam approach one another to facilitate said slip compressive fit by virtue of friction as between said first and second fingers and the beam and the chain link wire mesh, a portion of said first and second finger flat sides are in frictional contact with the beam and the chain link wire mesh, wherein operationally said extension structure distal end portion facilitates said slip compressive fit manually when a user is a remote distance away from the beam and operationally a portion of said connecting member flat side is adjacent with the beam forming a contact area parallel to the beam longitudinal axis, all to help prevent movement of a moment about the beam perpendicular axis of said camera support apparatus;

(b) positioning said second finger distal end portion in contact with the beam and simultaneously positioning said first finger offset adjacent to the chain link wire mesh via manual movement of said extension structure distal end portion; and (c) pulling said extension structure distal end portion manually away from the beam to initiate said first and second fingers and said connecting member have a slip compressive fit removable engagement via said stiffness with a combination of the beam and the chain link wire mesh, said offset being operational to progressively increase said slip compressive fit as said connecting member and the beam approach one another, wherein said combination of first and second fingers and said connecting member deflect outward dimensionally an amount greater than the chain link wire mesh deflecting inwardly as said connecting member and the beam approach one another to facilitate said slip compressive fit by virtue of friction as between said first and second fingers and the beam and the chain link wire mesh, a portion of said first and second fingers flat sides are in frictional contact with the beam and the chain link wire mesh and eventually a portion of said connecting member flat side is in contact with the beam forming an adjacent contact area parallel to the beam longitudinal axis, thus ceasing said pulling step, wherein said camera support apparatus is in place upon the fence structure to help prevent movement of a moment about the beam perpendicular axis of said camera support apparatus and to help prevent movement of a moment about the beam longitudinal axis of said camera support apparatus.

15. A method of acquiring camera images of an event according to claim 14 further comprising a step of pushing said extension structure distal end portion toward the beam to remove said camera support structure from the fence structure.

16. A method of acquiring camera images of an event, utilizing camera support by a fence structure having a beam with a longitudinal axis and a perpendicular axis, comprising the steps of:

(a) providing a camera support apparatus that includes an inverted "U" shaped flexible member including a first finger extension with a first proximal end portion and an opposing first distal end portion with a first extension axis therebetween, a second finger extension with a second proximal end portion and an opposing second distal end portion with a second extension axis therebetween, wherein said first and second extension axes are substantially parallel to one another, said first finger distal end portion is partially offset away from said second finger, wherein each of said first and second fingers are in the form of a substantially flat sided blade cross sectional profile that is perpendicular to each of said first and second extension axes, further wherein said first and second proximal end portions are each joined by a connecting member, wherein said connecting member is in the form of a substantially flat sided blade that has a matching profile to said first and second fingers substantially flat sided blade cross sectional profiles, wherein a combination of said first and second fingers, and said connecting member have a stiffness K factor range of about ten to thirty pounds per inch at said first and second distal end portions, said second finger extension having a length that is longer than a length of said first finger extension, said camera support apparatus also including a camera mount interface extending from said connecting member, said camera mount interface is positioned opposite of said first and second fingers, said camera mount interface is adapted to removably engage a camera, additionally included in said camera support apparatus is an extension structure with a proximal end portion and an opposing distal end portion with a lengthwise axis therebetween, wherein said extension structure proximal end portion is removably engagable to said flexible member and positioned such that said extension structure distal end portion extends beyond said second finger distal end portion, wherein said first and second fingers and said connecting member have a slip compressive fit removable engagement via said stiffness with the beam, said offset being operational to progressively increase said slip compressive fit as said connecting member and the beam approach one another wherein operationally said combination of first and second fingers and said connecting member deflect outward dimensionally as said connecting member and the beam approach one another to facilitate said slip compressive fit by virtue of friction as between said first and second fingers and the beam, a portion of said first and second finger flat sides are in frictional contact with the beam, wherein operationally said extension structure distal end portion facilitates said slip compressive fit manually when a user is a remote distance away from the beam and operationally a portion of said connecting member flat side is adjacent with the beam forming an adjacent contact area parallel to the beam longitudinal axis, all to help prevent movement of a moment about the beam perpendicular axis of said camera support apparatus;

(b) positioning said second finger distal end portion in contact with the beam and simultaneously positioning said first finger offset adjacent to the beam via manual movement of said extension structure distal end portion; and (c) pulling said extension structure distal end portion manually away from the beam to initiate said first and second fingers and said connecting member have a slip compressive fit removable engagement via said stiffness with the beam, said offset being operational to progressively increase said slip compressive fit as said connecting member and the beam approach one another, wherein said combination of first and second fingers and said connecting member deflect outward dimensionally as said connecting member and the beam approach one another to facilitate said slip compressive fit by virtue of friction as between said first and second fingers and the beam, a portion of said first and second fingers flat sides are in frictional contact with the beam and eventually a portion of said connecting member flat side is adjacent with the beam forming an adjacent contact area parallel to the beam longitudinal axis, thus ceasing said pulling step, wherein said camera support apparatus is in place upon the beam to help prevent movement of a moment about the beam perpendicular axis of said camera support apparatus and to help prevent movement of a moment about the beam longitudinal axis of said camera support apparatus.

17. A method of acquiring camera images of an event according to claim 16 further comprising a step of pushing said extension structure distal end portion toward the beam to remove said camera support structure from the beam.

18. A camera support apparatus, supported by a fence structure having a beam with a longitudinal axis and a perpendicular axis, said camera support apparatus comprising:

(a) an inverted "L" shaped flexible member including a first finger extension with a first proximal end portion and an opposing first distal end portion with a first extension axis therebetween and a connecting member;

(b) an extension structure with a proximal end portion and an opposing distal end portion with a lengthwise axis therebetween, wherein said extension structure proximal end portion is removably engagable to said connecting member and positioned such that said extension structure distal end portion extends beyond said first finger distal end portion and said lengthwise axis and said first extension axis are substantially parallel to one another, wherein a combination of said first finger and said connecting member have a stiffness K factor range of about ten to thirty pounds per inch as between said first distal end portion and said extension structure proximal end portion; and (c) a camera mount interface extending from said connecting member, said camera mount interface is positioned opposite of said first finger, said camera mount interface is adapted to removably engage a camera, wherein said first finger and said extension structure proximal end portion have a slip compressive fit removable engagement via said stiffness with the beam, wherein operationally said combination of first finger and said connecting member deflect outward dimensionally as said connecting member and the beam approach one another eventually becoming adjacent with one another to facilitate said slip compressive fit by virtue of friction as between said first finger and the beam and said extension structure proximal end portion and the beam to help prevent movement of a moment about the beam perpendicular axis of said camera support apparatus.

* * * * *